United States Patent
Chao et al.

(10) Patent No.: US 7,413,763 B2
(45) Date of Patent: Aug. 19, 2008

(54) METHOD OF FABRICATING CARBON NANOTUBE FIELD EMISSION SOURCE

(75) Inventors: Ching-Hsun Chao, Kaohsiung (TW); Jyh-Rong Sheu, Hsinchu (TW); Liang-Yu Chiang, Taipei Hsien (TW); Yu-Yang Chang, Tainan (TW); Cheng-Chung Lee, Taitung (TW)

(73) Assignee: Industrial Technology Research Institute, Hsinchu (TW)

( * ) Notice: Subject to any disclaimer, the term of this patent is extended or adjusted under 35 U.S.C. 154(b) by 641 days.

(21) Appl. No.: 10/706,907

(22) Filed: Nov. 14, 2003

(65) Prior Publication Data
US 2005/0062195 A1  Mar. 24, 2005

(30) Foreign Application Priority Data
Sep. 23, 2003 (TW) .............................. 92126261 A

(51) Int. Cl.
*B05D 5/12* (2006.01)
(52) U.S. Cl. ........................................ 427/77; 427/256
(58) Field of Classification Search .................. 427/77, 427/256, 282
See application file for complete search history.

(56) References Cited

U.S. PATENT DOCUMENTS

| | | | |
|---|---|---|---|
| 6,436,221 B1 * | 8/2002 | Chang et al. ................. | 156/247 |
| 6,692,791 B2 * | 2/2004 | Chang et al. ................. | 427/77 |
| 6,935,915 B2 * | 8/2005 | Park et al. ..................... | 445/24 |
| 7,154,214 B2 * | 12/2006 | Chao et al. ................... | 313/351 |
| 2003/0034721 A1 * | 2/2003 | Windischmann et al. ..... | 313/309 |

FOREIGN PATENT DOCUMENTS

WO   WO 2004/102604   * 11/2004

* cited by examiner

*Primary Examiner*—Brian K Talbot
(74) *Attorney, Agent, or Firm*—Troxell Law Office, PLLC

(57) ABSTRACT

A method of transferring imprint carbon nano-tube (CNT) field emitting source is disclosed. Firstly, cathode lines are screen printed on a substrate. Then a dielectric layer formation on the cathode lines and substrate is followed. Afterward, gate lines formed on the dielectric layer by screen printing are performed. Next a patterning process is carried out to form openings. Subsequently, an imprint negative mold is dipped with CNT paste and imprinted the CNT paste on the cathode lines through the openings. After drawing of pattern from the imprint mold, the CNT paste is cured by annealing. Since the emitting sources are formed through the imprint negative mold, as a result, the size and shape can be predetermined. Moreover, the intervals between gate line and the emitting source are readily control, which resolve the circuit short problem between gate and cathode. Consequently, the current density, brightness, and uniformity of the emitter sources are significantly improved.

7 Claims, 3 Drawing Sheets

METHOD OF FABRICATING CARBON NANOTUBE FIELD EMISSION SOURCE

FIELD OF THE INVENTION

This invention relates to a field emission display, more particularly to a method of fabricating carbon nanotube (CNT) field emitters by using a method of imprint. By virtue of the imprint mold, both size and shape of emitting source are capable of handling, and the distance between emitting source and gate for three electrodes is easily controlled well. Thus the purpose of lower the driving voltage and cost can be achieved

BACKGROUND OF THE INVENTION

Nanotube field emission display comprises an emitting image pixel array formed of conductive paste being screen printed on a substrate having patterned silver cathode thereon. The conductive paste consisting of carbon nanotube (CNT), organic bonding agent, and silver powder. The CNT has a shape of about 5-100 nm in diameter and 1000-3000 nm in length. The principle of field emission is in terms of electric field accelerating cold electrons which are emitted from the tip of each CNT through vacuum space and bombards anode which is an indium tin oxide (ITO) substrate having phosphor pixel to generate fluorescence. By contrast to conventional cathode ray tube, it is in terms of a principle of emitted electrons thermoionically from a tungsten wire, the field emission molding has a quite different way.

Field emission display can have a benefit of very thin electron gun of only about 0.2 mm in thickness. In addition, the size of planar area can have very flexible, it can be very small such as 1 $cm^2$ and can as large as several hundred centimeter square. The CNT-FED (CNT-field emission display) is thus a prominence for an ultra thin flat panel display. For a display, the stability and long life reliability are fundamental characteristics. However, as high as 10-100 $mA/cm^2$ in current density is a minimum criteria and the most critical characteristic for generating sufficient brightness and uniformity for a display. To approach such current density, the lower intensity electrical field is preferred. Preferably, it should be lower than 25 V/μm.

The electric property (current density vs. intensity of electric field) is predetermined by a number of exposed CNT. Thereafter, to improve the fluorescence efficiency, a three-electrode structure is a common control switch for field emitting display. The principle of the three-electrode structure of CNT-FED is by means of anode to provide energy for electrons, a cathode as an electron emitting source, and a gate provided for accelerating the outgoing electrons.

Currently to form a CNT field emitting source, a CNT paste mixed with CNT and organic bonding agent are provided. A method of screen print is then used to coat the CNT paste on the patterned silver electrodes through the openings of the three-electrode structure, Whereas, a prerequisite of using screen print technique is that it should have appropriate mounting areas provided for CNT paste so that the CNT paste can accurately paste on the targets. However, a typical size of opening 2 for forming a CNT-FED pixel of three-electrode structure is about 80 μm in width and 30 μm in depth, as is shown in FIG. 1. The sidewall of opening is readily adhered with some CNT paste, as a result, the cathode electrode may be short to the gate electrode 1. Even worse, the CNT paste does not adhere to the cathode line anyway.

Another technique by the conventional method includes the steps of: coating a CNT layer on the silver cathodes; forming a dielectric layer on the CNT layer, forming gate lines on the dielectric layer and then patterning the dielectric layer so as to expose desired CNT. The disadvantages of this technique include: the openings for pixel are difficult to etch due to too deep of the opening and contamination generated on the CNT during etching step.

Still another technique of the traditional method is the emitting source formed by coating a photo-sensitive CNT paste and then performing a lithographic step to form desired CNT emitting sources. The deficient of this technique includes incompletely exposure of photo-sensitive CNT paste on sidewall. After developing, some residues on the sidewall are often found. As a result, the gate electrode may be shorted to the cathode, The forgoing prior arts do not provide an available method to solve aforementioned problems found in the fabricating process for the three-electrode CNT emitting source. Thus, an object of the present invention is to provide a method which solve above issues by simple processes, i.e. an imprint method.

SUMMARY OF THE INVENTION

The present invention is to propose a simple CNT field emitter forming method, which significantly improves short problem between cathode and the gate of the three-electrode structure field emitter. Moreover, the shape and size of the CNT emitting source are predetermined by the imprint mold.

The present invention discloses a method of transferring imprint carbon nano-tube (CNT) field emitting sources. The method comprises following steps: Firstly, cathode lines are screen printed on a substrate. Then a dielectric layer formation on the cathode lines and substrate is followed. Afterward, gate lines formed on the dielectric layer by screen printing are performed. Next a patterning process is carried out to form openings. Subsequently, an imprint negative mold is dipped with CNT paste and imprinted the CNT paste on the cathode lines through the openings. After drawing of pattern from the imprint negative mold, the CNT paste is cured by annealing. Since the emitting sources are formed through the imprint mold, as a result, the size and shape can be predetermined. Moreover, the intervals between each gate line and the emitting source are readily control, which resolve the circuit short problem between gate and cathode. Consequently, the current density, brightness, and uniformity of the emitter sources are significantly improved.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE INVENTION

The conventional fabricating processes for a CNT field emission source formed descried in the background of the invention are usually by a screen print method, which prints a CNT paste layer on cathode lines through openings of the three-electrode structure. Each opening is located at an interval between two gate-lines (vertical lines) having a cathode line (horizontal line) pass through thereto. Since no available mounting points provided in the bottom of the openings for 30 µm in depth of the openings have, the CNT paste is usually adhered to the sidewalls of the openings.

For a case of using a photosensitive CNT paste layer, the situation is still not being improved due to incomplete exposure on sidewalls during a lithographic process. The present invention can improve above problems. Moreover, the shape and size of the emitting sources can even predetermine.

Figure 1:
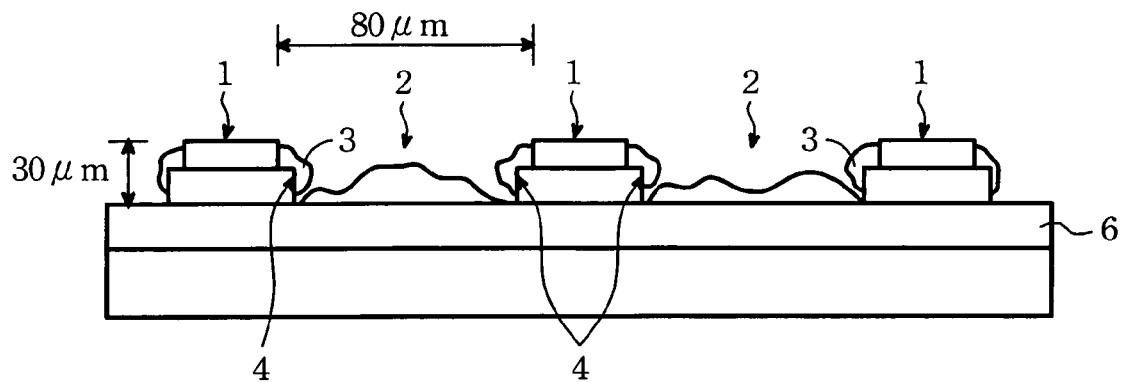
FIG. 1 illustrates sidewalls of the opening for pixels of CNT field emission display are often being found stained with CNT paste in accordance with the conventional screen print structure.
Figure 2:
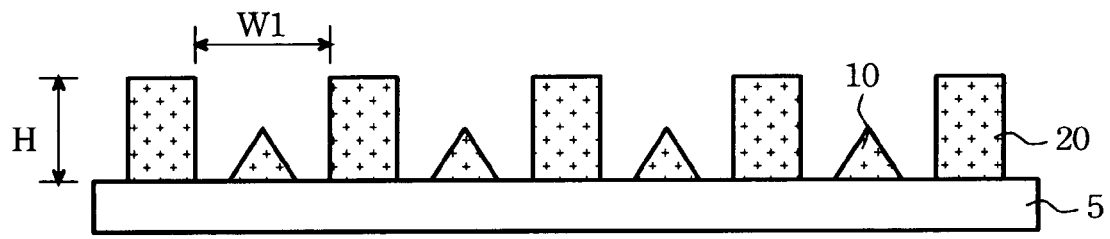
FIG. 2 illustrates an imprint positive mold formed in accordance with the present invention.

The method is described in detailed as follows;

Firstly, a step of providing an imprint positive mold is performed. The imprint positive mold has the same patterns as the predetermined pattern for imprint. As is shown in FIG. 2, a conventional lithographic and etch step such as photo mask, electron beam or focus ion beam are utilized to pattern a mold material so as to form the imprint positive mold with positive pattern on a substrate 5. The positive pattern includes a first pattern 10 having a plurality cones and a second pattern 20 having a plurality of pillars. The cone and pillar are interlaced distribution. The first pattern 10 is to imprint emitting sources on cathode lines. The second pattern 20 is to housing the gate structure (please see FIG. 6). The altitude of the pillar has to be high enough so as to avoid CNT paste touching with the gate structure while performing imprint step. Surely, the positive pattern has to be transferred to the negative pattern for imprint.

In a preferred embodiment, the spacing W1 between two pillars 20 is between about 10-100 µm and the altitude H of the pillar is between about 5-50 µm. Surely, the cone in the first pattern 10 illustrates but does not intend to limit the claim scope. For example, the candidates of the first pattern may be selected from a shape of cylinder, pyramid, star, or any other shapes if it can satisfy the conditions of readily drawing of pattern from the imprint positive mold and the resulted emitting sources benefit to the electron emitting from the CNT tips. The benefit the electron emitting indicates those CNT emitting source formed easily to make CNT be erected even using a physical method. For example using a tape pulls up the CNT. Worthwhile, the cone in between two pillars is not limit to just one, as those are shown in FIG. 2. It may include more, which includes the any shape structure combination such as the same shape or different shapes.

Figure 3:
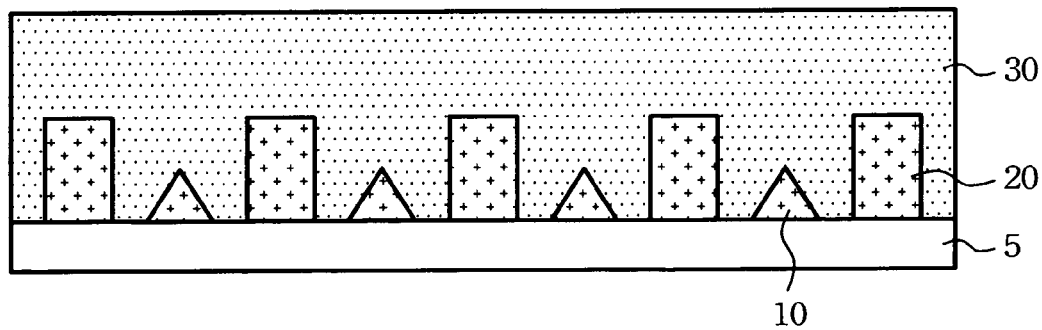
FIG. 3 illustrates an imprint negative mold formed in accordance with the present invention.

Thereafter, as is shown in FIG. 3, a step of imprint negative mold 30 formation is carried out by injecting liquid form of mold material such as acrylic resin, or the material such as polymethyl methacrylate or polydimethyl into the imprint positive mold. Appropriate pressure and/or temperature are required to curing them. After curing, a step of drawing of patterns from the imprint positive mold is performed. The results are shown in FIG. 3. Certainly, some grease may be used before mold material injection so that the imprint negative mold can easily lift off the imprint positive mold.

Figure 4:
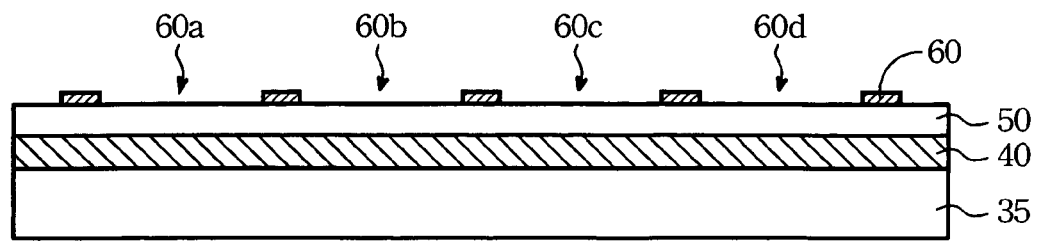
FIG. 4 illustrates cathode lines, dielectric layer, and gate lines are formed in accordance with the present invention.

Subsequently, a substrate 35 having cathode lines 40 formed thereon is provided. A screen print can be utilized to print silver paste so as to form cathode lines 40. The width of the cathode lines is between about 150-300 µm and the spacing between two cathode lies 40 is between about 50-150 µm. Afterward, a dielectric layer 50 is deposited on the substrate 35 overlaying the cathode lines 40, as is shown in FIG. 4.

Figure 5A:
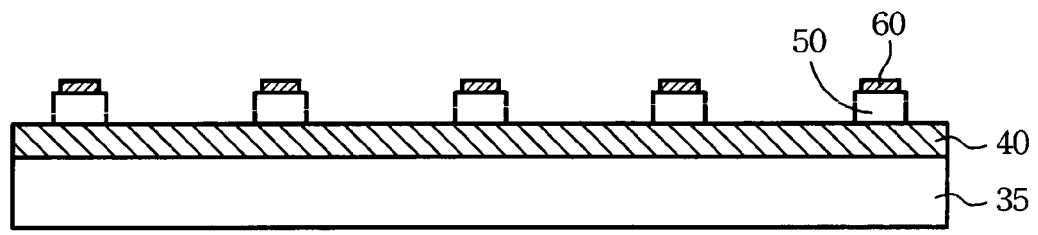
FIG. 5A illustrates openings of three-electrode structure are formed in accordance with the present invention.
Figure 5B:
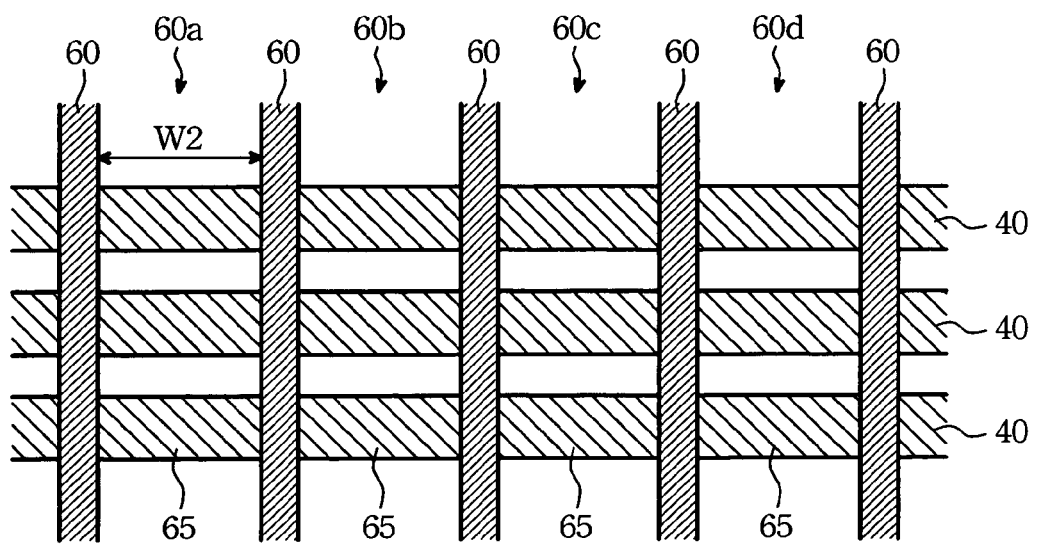
FIG. 5B shows a three-electrode structure for CNT FED top-view in accordance with the present invention.

Referring to FIG. 5A, a conductive layer 60 is formed on the dielectric layer 50. A lithographic and an etching are then performed to pattern the conductive layer so as to define gate lines 60. The gate lines 60 can be formed by a screen print technique too. In FIG. 5, the gate lines 60 are perpendicular to the cathode lines 40. The intercrossing positions 65 of intervals between two gate lines 60, such as 60a, 60b, 60c, and 60d with the cathode lines 40 formed the pixels 65, as is shown in the FIG. 5B. The spacing W2 between two gate lines is between about 30-300 µm. Afterward, a lithographic and etching steps are performed to form openings through pattern dielectric layer 50 until the silver cathode lines 40 are exposed. Generally, a distance between the edge of the conductive layer of gate line 60 and an edge of the opening is between about 1-5 µm to prevent them from shorting etch other.

Figure 6:
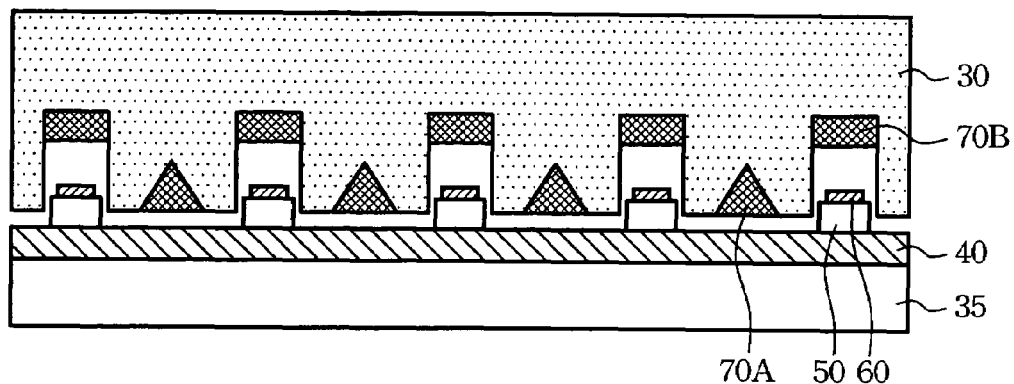
FIG. 6 showing an imprint negative mold dipped with CNT paste is prepared to imprint for CNT emitting sources in accordance with the present invention.

Subsequently, the imprint negative mold 30 dipped with the CNT paste which are mixed with appreciate concentration of CNT, silver powder, and organic bonding agent. As is shown in FIG. 6, the CNT paste 70A will be imprinted on the predetermined pixels so as to form emitting sources 80, and the CNT paste 70B in the trenches (the reverse pattern of pillar 20) will not touch with the gate lines 60.

Figure 7:
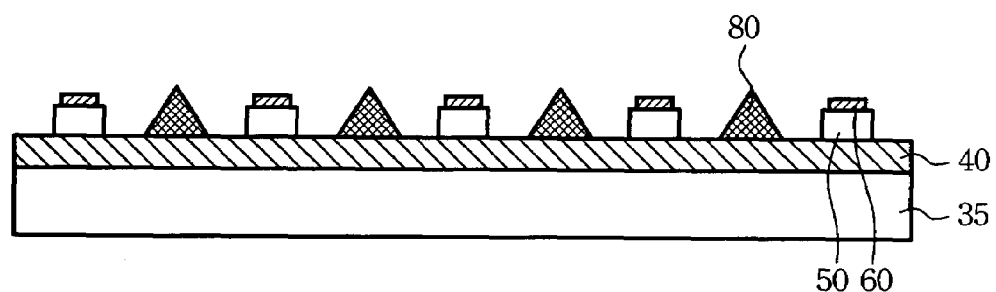
FIG. 7 showing CNT emitting sources are formed by imprint in accordance with the present invention.
Figure 8:
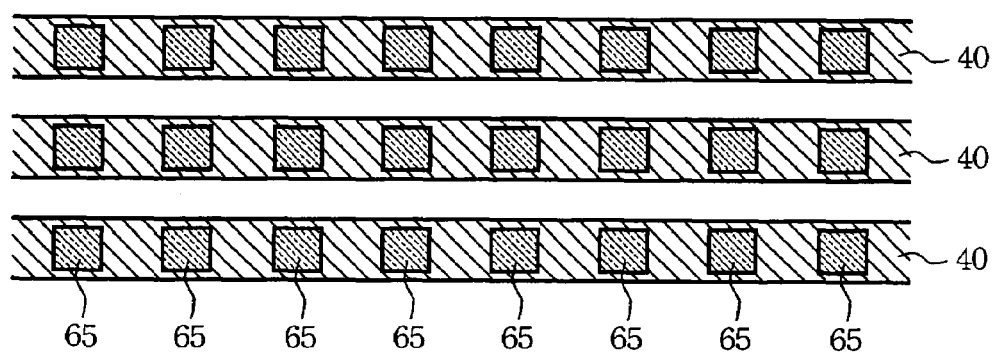
FIG. 8 shows a two-electrode structure for CNT FED top-view in accordance with the present invention.

Referring to FIG. 7, a removal of the imprint negative mold 30 is performed. Preferably, it can optionally coat with an organic bonding layer (not shown) on the cathode line 40 and an affinity water layer optionally formed on the gate lines 50 before imprinting. In an embodiment, a photosensitive bonding layer is coated on all exposed areas and then performs a lithographic step to remove excess photosensitive bonding layer except those on the cathode lines 40. In another embodiment, the pillars 20 may form with enough altitude, so that the trench pattern in the imprint negative mold is deep enough. And then even the organic bonding layer (not shown) is coated on all areas, it still does not need a lithographic step. In addition, the organic bonding layer should have lower or the same volatilizing temperature as the organic boding agent in the CNT paste so that they can be removed simultaneously during sintering process.

Finally, a laser beam or an ultraviolet beam is utilized to cure and solidify the CNT ad remove those organic agent.

The benefits of the invention include:
(1) Since the CNT layer is imprinted on the cathode lines without performing etch step as conventional process, thus the present invention provides simple, low cost, and no contamination processes.
(2) The shape and size of the CNT field emitting source is determined by the imprint positive and/or negative mold thereof. Thus the processes are more flexible than conventional processes.
(3) The interval between emitting source and the gate line can be predetermined. The stability is thus better than conventional process. The driving voltage can thus decrease.

As is understood by a person skilled in the art, the foregoing preferred embodiment of the present invention is an illustration of the present invention rather than limiting thereon. It is intended to cover various modifications and similar arrangements included within the spirit and scope of the appended claims, the scope of which should be accorded the broadest interpretation so as to encompass all such modifications and similar structure. For example, the three-electrode structure provided herein is for illustrating convenience, the method can be utilized in two-electrode structure too. The differences between two-electrode and three-electrode structure are, respectively, without and with gate lines and the distance between the anode and cathode (two-electrode structure has a shorter distance) Thus, the design of imprint mold is more simple since gate lines is not necessary.

What is claimed is:

1. A method of forming CNT emitting sources, said method comprising the steps of:
   providing a substrate;
   forming a plurality of cathode lines on said substrate;
   forming a dielectric layer on said substrate and overlaying said cathode lines;
   forming a plurality of gate lines on said dielectric layer, said cathodes lines being perpendicular to said gate lines so as to define said pixels; and
   patterning said dielectric layer over said pixels so as to form said openings which expose said cathode lines;
   providing an imprint negative mold having a first pattern for imprinting emitting sources;
   utilizing said imprint negative mold dipped with CNT paste;
   using said imprint negative mold imprinting said CNT paste on said cathode lines through said openings; and
   curing said CNT paste to form said CNT emitting sources, wherein said imprint negative mold comprises a trench pattern housing said gate lines so as to prevent the CNT paste adhering to said gate lines while imprinting.

2. The method according to claim 1 wherein said step of forming cathodes lines is formed by screen print with a silver layer on said substrate.

3. The method according to claim 1 wherein said step of forming gate lines is formed by screen print with a conductive layer on said dielectric layer.

4. The method according to claim 1 wherein said gate lines have a spacing between about 30-300 μm in between.

5. The method according to claim 1 wherein said openings have a depth between 5-50 μm and a width between about 10-100 μm.

6. The method according to claim 1 wherein said imprint negative mold comprising an inverse pattern selected from the group consisting of cone, cylinder, star, pyramid and the combination thereof.

7. The method according to claim 1 wherein said imprint negative mold is formed comprising the steps of:
   providing a first mold material;
   patterning said first mold material to form an imprint positive mold which comprises patterns for said gate lines and said emitting sources;
   injecting a second mold material in liquid state into a mold which encloses said imprint positive mold;
   solidifying said second mold material; and
   drawing of pattern from said imprint positive mold so that said imprint negative mold is formed.

* * * * *